(No Model.)

J. S. BLINN.
STOPPER FOR MUCILAGE BOTTLES.

No. 513,608. Patented Jan. 30, 1894.

WITNESSES
H. A. Lamb
Pearl Reynolds

INVENTOR
Joseph S. Blinn
By H. M. Wooster
Atty.

THE NATIONAL LITHOGRAPHING COMPANY,
WASHINGTON, D. C.

United States Patent Office.

JOSEPH S. BLINN, OF NEW HAVEN, CONNECTICUT.

STOPPER FOR MUCILAGE-BOTTLES.

SPECIFICATION forming part of Letters Patent No. 513,608, dated January 30, 1894.

Application filed February 6, 1893. Serial No. 461,129. (No model.)

*To all whom it may concern:*

Be it known that I, JOSEPH S. BLINN, a citizen of the United States, residing at New Haven, in the county of New Haven and State of Connecticut, have invented certain new and useful Improvements in Stoppers for Mucilage-Bottles; and I do hereby declare the following to be a full, clear, and exact description of the invention, such as will enable others skilled in the art to which it appertains to make and use the same.

My invention has for its object to provide a simple and inexpensive stopper for mucilage bottles which will permit a filled bottle of mucilage to be carried about and turned in any position without danger of leakage, will always be ready for use, it being practically impossible for it to become permanently clogged, in which the quantity of mucilage allowed to escape may be regulated at will, the flow from the bottle being cut off by the stopper itself while mucilage that has been allowed to escape is being spread.

With these ends in view I have devised the novel stopper of which the following description in connection with the accompanying drawings is a specification, numbers and letters being used to designate the several parts.

Figure 1:
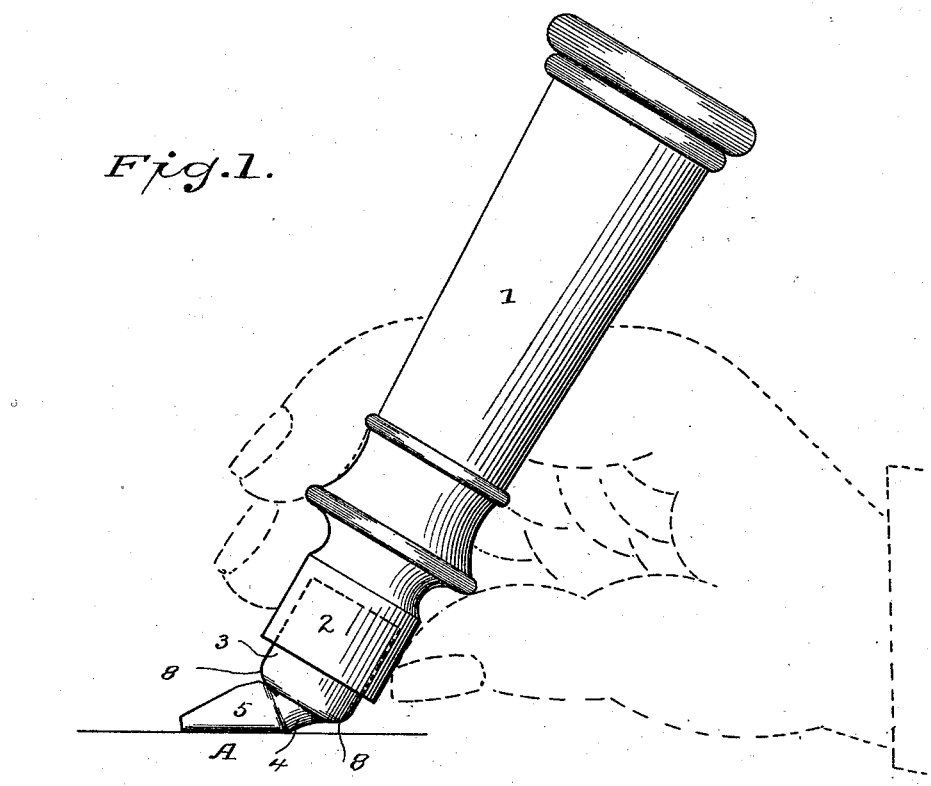
Figure 2:
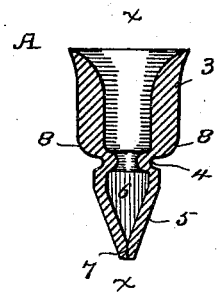
Figure 4:
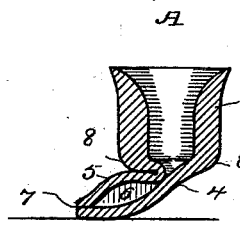
Figure 3:
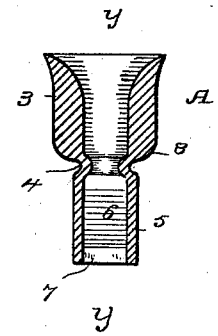

Figure 1 is a view illustrating the mode of use of a mucilage bottle provided with one of my novel stoppers; Fig. 2 a section of the stopper on the line *y y* in Fig. 3; Fig. 3 a section of the stopper on the line *x x* in Fig. 2, and Fig. 4 is a section upon the same section line as Fig. 2, the position corresponding with Fig. 1, and illustrating the manner in which the passage of mucilage from the bottle into the reservoir is cut off, and the mucilage within the reservoir is forced out.

1 denotes a bottle which may be of any suitable shape or size and is preferably provided with a relatively large neck 2.

A denotes the stopper as a whole which is preferably made of rubber of suitable size to fit either upon the inside or the outside of the neck of the bottle. In practice I preferably make the stoppers to fit the inside of the neck of the bottle as shown in the drawings.

3 denotes the body of the stopper which is made of suitable size to fit the class of bottles for which it is intended. Above the body is a relatively narrow neck 4 and above the neck is a head 5 the interior of which constitutes a reservoir 6 from which the mucilage is pressed out in use. The ends of the head are preferably made straight sided and the sides flat and inclining toward each other as shown in Fig. 2. At the apex of the head is a slot 7 through which the mucilage passes in use.

The operation of my improved stopper is clearly shown in Fig. 4. When the bottle and stopper are inverted mucilage of course passes into the reservoir and none can pass out therefrom. When it is desired to force the mucilage out, the bottle and stopper are placed in substantially the position shown in Fig. 4 and the bottle inclined toward the head forcing the shoulder at the upper end of the body, which I have designated by 8, against the under side of the head thereby forcing out through the slot as much mucilage as may be required. It should be noticed that this movement closes the neck entirely so that no mucilage can pass out into the reservoir and only the desired quantity will pass out from the reservoir through the slot. As soon as the desired quantity of mucilage has been forced out, the sides of the stopper are used to spread it, the amount of mucilage that passes out at the slot being wholly within the control of the operator. Should the mucilage clog and cause the sides of the slot to stick together the operator simply places the thumb and finger against the ends of the head and presses inward thereby forcing the slot open.

Having thus described my invention, I claim—

A stopper consisting of a main reservoir, a supplemental reservoir connected therewith and comprising the inclined sides converging toward the top and having the discharge slit between them and the neck connecting the two reservoirs, the wall of said neck extending inwardly forming an indentation or corrugation, the said main reservoir having an overhanging shoulder 8 adjacent to the indentation and adapted to bear on the inclined side of the supplemental reservoir, substantially as described.

In testimony whereof I affix my signature in presence of two witnesses.

JOSEPH S. BLINN.

Witnesses:
A. M. WOOSTER,
P. M. REYNOLDS.